(12) United States Patent
Eguchi et al.

(10) Patent No.: US 12,489,823 B2
(45) Date of Patent: Dec. 2, 2025

(54) INFORMATION PROCESSING APPARATUS THAT DETERMINES NETWORK ENVIRONMENT OF A DEVICE, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Takami Eguchi, Tokyo (JP); Nobuhiro Tagashira, Chiba (JP); Ayuta Kawazu, Kanagawa (JP); Yuki Minetomo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 18/474,996

(22) Filed: Sep. 26, 2023

(65) Prior Publication Data
US 2024/0106908 A1 Mar. 28, 2024

(30) Foreign Application Priority Data
Sep. 28, 2022 (JP) ................. 2022-155297

(51) Int. Cl.
  *H04L 67/51* (2022.01)
  *H04L 9/40* (2022.01)
  *H04L 41/0893* (2022.01)
  *H04L 41/16* (2022.01)
  *H04L 43/08* (2022.01)

(52) U.S. Cl.
CPC .......... *H04L 67/51* (2022.05); *H04L 41/0893* (2013.01); *H04L 41/16* (2013.01)

(58) Field of Classification Search
CPC ..... H04L 67/51; H04L 41/0893; H04L 41/16; H04L 43/08; H04L 63/20
See application file for complete search history.

(56) References Cited

U.S. PATENT DOCUMENTS

2008/0181626 A1* 7/2008 Mizutani ............... G06F 3/1273
  399/24
2019/0265920 A1* 8/2019 Fujii ................... H04L 41/0846
(Continued)

FOREIGN PATENT DOCUMENTS

JP  2018107575 A * 7/2018
JP  2023114275 A    8/2023

*Primary Examiner* — Alina A Boutah
(74) *Attorney, Agent, or Firm* — Canon U.S.A., Inc. IP Division

(57) ABSTRACT

An information processing apparatus includes an acquisition unit that performs acquiring first information used for determining a network environment to which a device belongs, and second information indicating the network environment to which the device belongs, a determination unit that performs determining a network environment to which the device belongs, based on the first information, a generation unit that performs generating, based at least on whether the network environment determined by the determination unit matches with the network environment indicated by the second information, learning data used in learning processing of a learning model that is used by the device to determine the network environment, and a learning unit that performs the learning processing using the learning data.

14 Claims, 10 Drawing Sheets

(56) References Cited

U.S. PATENT DOCUMENTS

| | | |
|---|---|---|
| 2020/0073341 A1* | 3/2020 | Ichikawa ................ G06F 1/325 |
| 2020/0118052 A1* | 4/2020 | Jensen ............. G06Q 10/06312 |
| 2020/0213470 A1* | 7/2020 | Kikuchi ............... G06F 3/1204 |
| 2020/0320434 A1* | 10/2020 | Osano .................... G06F 30/27 |
| 2022/0045913 A1* | 2/2022 | Wang ...................... G06F 18/24 |
| 2022/0294696 A1* | 9/2022 | Ciulla ................. H04L 61/4541 |
| 2023/0231769 A1* | 7/2023 | Minetomo .......... H04L 41/0806 |
| | | 709/220 |

\* cited by examiner

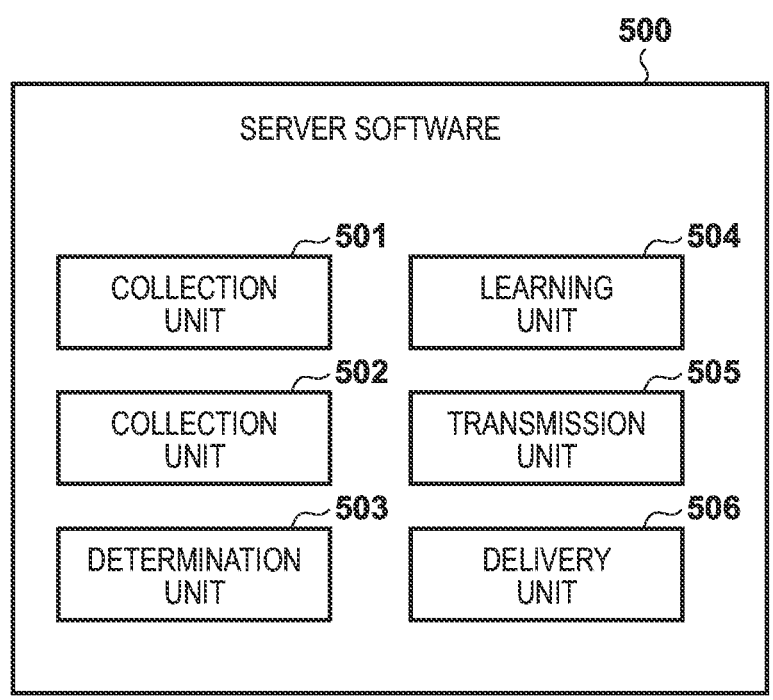

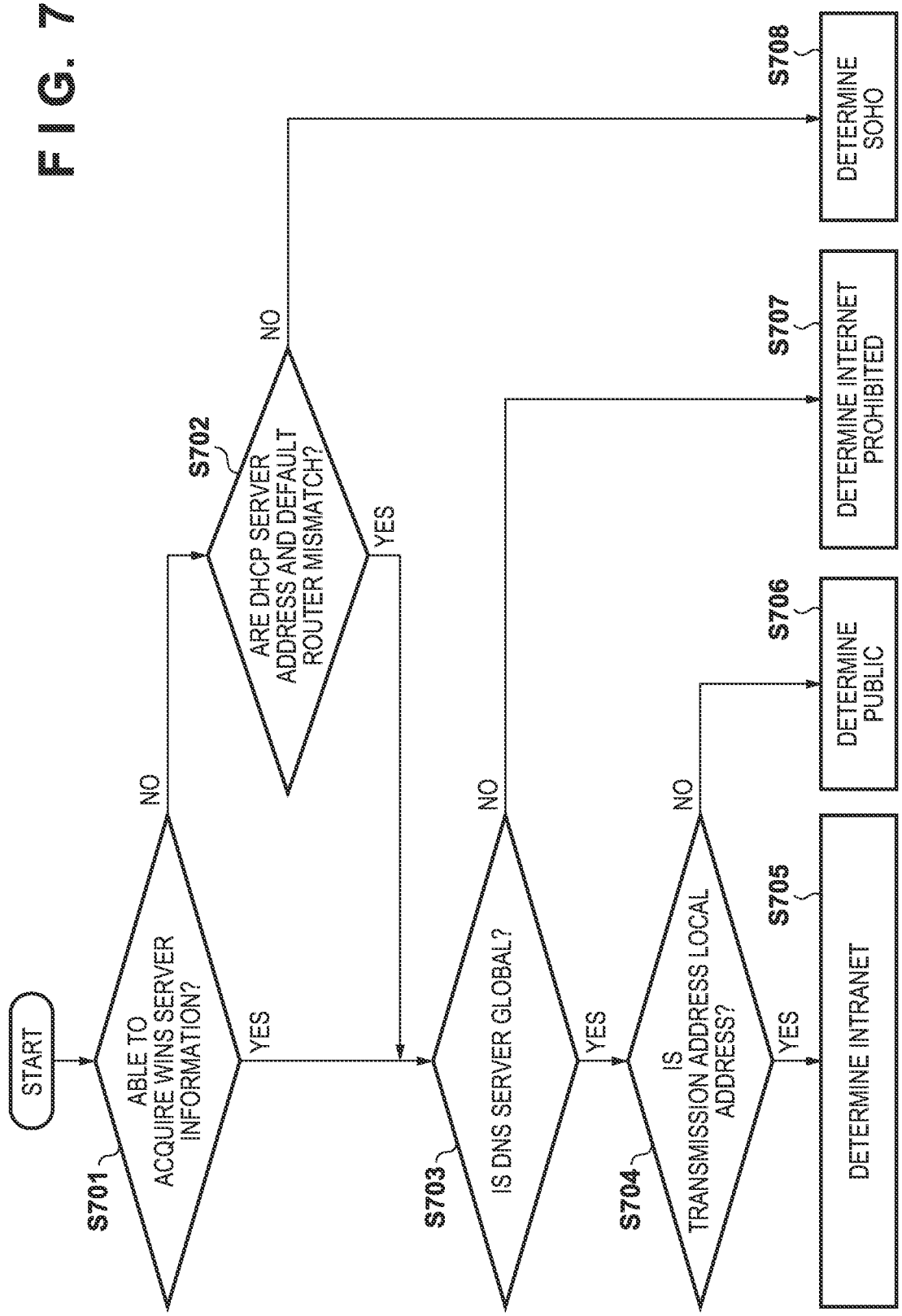

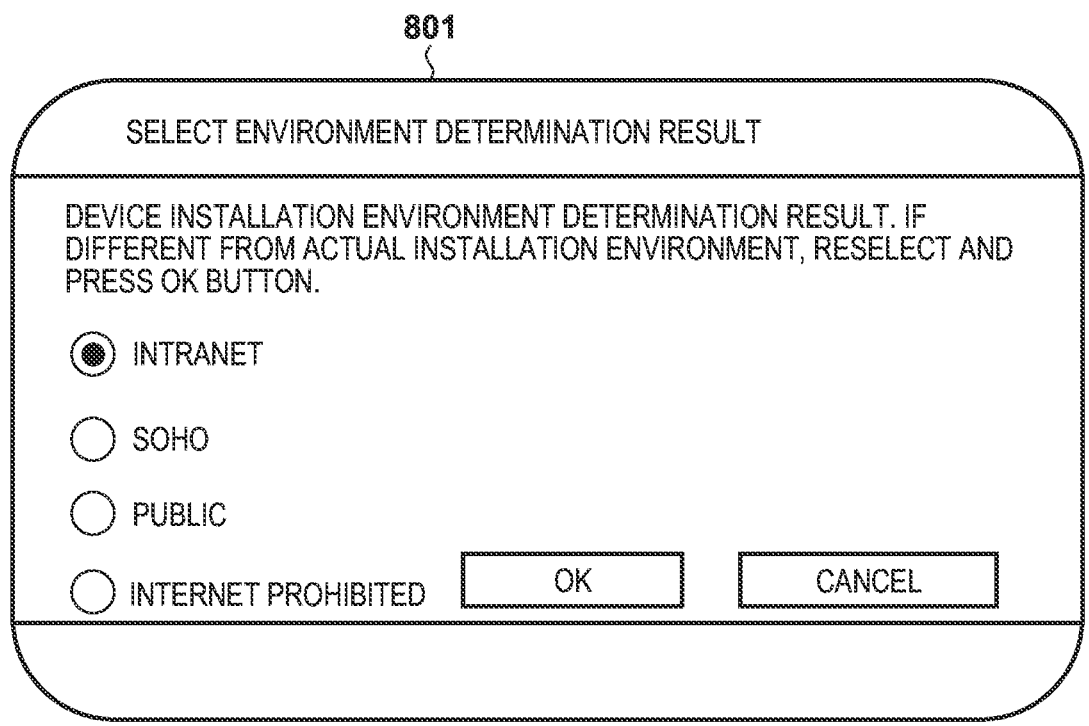

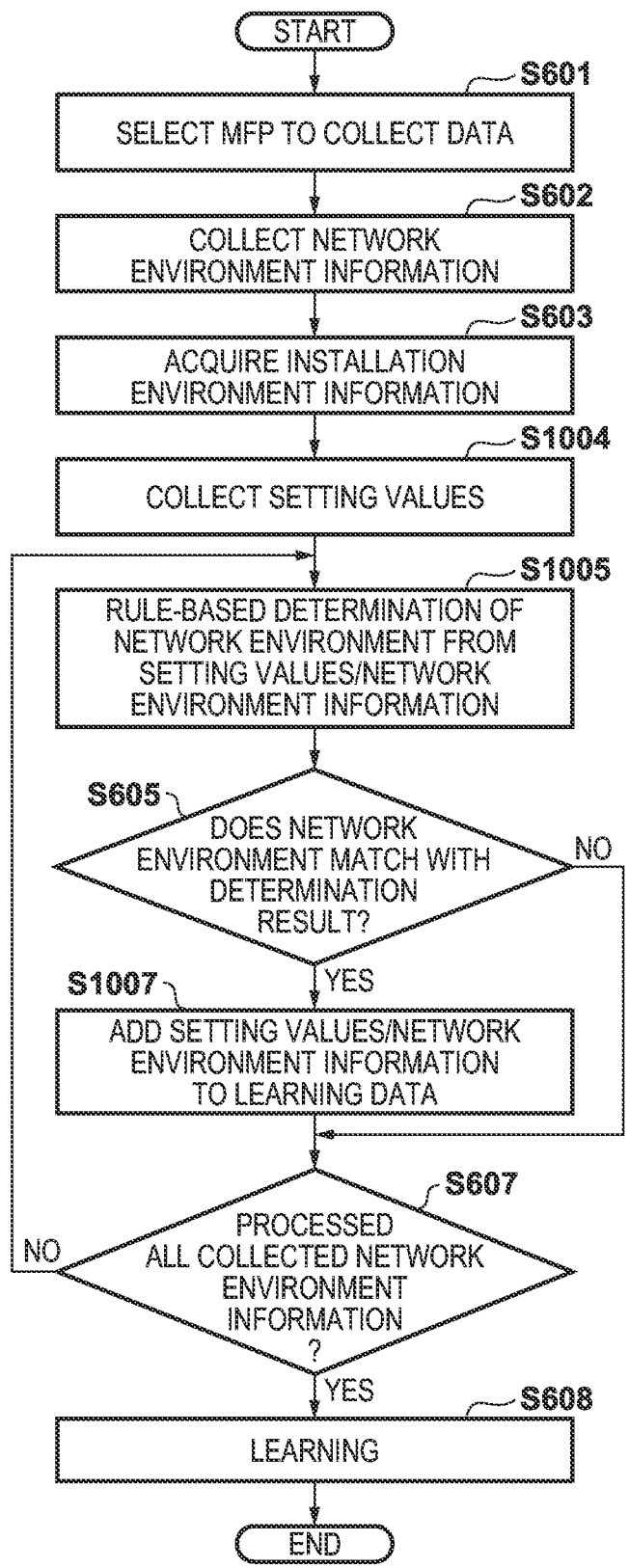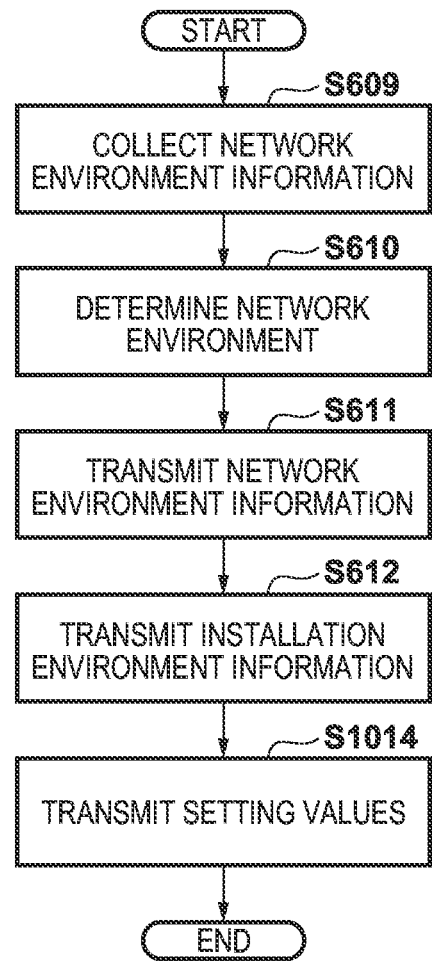
FIG. 10A
FIG. 10B

INFORMATION PROCESSING APPARATUS THAT DETERMINES NETWORK ENVIRONMENT OF A DEVICE, INFORMATION PROCESSING METHOD, AND NON-TRANSITORY COMPUTER-READABLE STORAGE MEDIUM

BACKGROUND

Field

The present disclosure relates to a learning technique of a learning model.

Description of the Related Art

In recent years, there is a growing variety of environments in which an information processing apparatus, such as a Personal Computer (PC) or a Multi-Function Peripheral (MFP), is installed. Such apparatuses may be installed, for example, in an entry-managed room such as an office, or may be installed at a public place where anyone can physically access such as a convenience store. Besides, a case where an information processing apparatus of a company is installed at home to be used for telework has also been increasing. In addition, security setting is also becoming complicated along with the increase of security functions provided in an information processing apparatus, and thus users of the information processing apparatus are required to determine whether to enable a large number of security setting items one by one.

Therefore, labor of a user is reduced by automatically and collectively performing a plurality of security settings in accordance with a security policy. The security policy refers to a basic policy related to information security of an entire organization. For example, a policy that mandates user authentication in operation of an information processing apparatus or mandates encryption of a communication path in communication with another information processing apparatus is defined as the security policy.

Japanese Patent Application No. 2022-016554 discloses that an installation environment is determined according to network environment information by a machine learning model, and a security policy suitable for the installation environment is applied, based on the determination result of the installation environment.

Conventionally, in machine learning, particularly in supervised learning, labeled data is collected and used for the learning as learning data in order to improve the inference accuracy of a machine learning model. However, the inference accuracy decreases when incorrect labeled data is provided.

SUMMARY

The present disclosure provides a technique for improving the accuracy of determination by a learning model for determining a network environment of a device.

According to the first aspect of the present disclosure, there is provided an information processing apparatus comprising: an acquisition unit configured to acquire first information used for determining a network environment to which a device belongs, and second information indicating the network environment to which the device belongs; a determination unit configured to determine a network environment to which the device belongs, based on the first information; a generation unit configured to generate, based at least on whether the network environment determined by the determination unit matches with the network environment indicated by the second information, learning data used in learning processing of a learning model that is used by the device to determine the network environment; and a learning unit configured to perform the learning processing using the learning data.

According to the second aspect of the present disclosure, there is provided an information processing method performed by an information processing apparatus, the method comprising: acquiring first information used for determining a network environment to which a device belongs, and second information indicating the network environment to which the device belongs; determining a network environment to which the device belongs, based on the first information; generating, based at least on whether the network environment determined by the determining matches with the network environment indicated by the second information, learning data used in learning processing of a learning model that is used by the device to determine the network environment, and performing the learning processing using the learning data.

According to the third aspect of the present disclosure, there is provided a non-transitory computer-readable storage medium storing a computer program for causing a computer to function as: an acquisition unit configured to acquire first information used for determining a network environment to which a device belongs, and second information indicating the network environment to which the device belongs; a determination unit configured to determine a network environment to which the device belongs, based on the first information; a generation unit configured to generate, based at least on whether the network environment determined by the determination unit matches with the network environment indicated by the second information, learning data used in learning processing of a learning model that is used by the device to determine the network environment; and a learning unit configured to perform the learning processing using the learning data.

Further features of the present disclosure will become apparent from the following description of exemplary embodiments with reference to the attached drawings.

BRIEF DESCRIPTION OF THE DRAWINGS

FIG. 5 is a block diagram illustrating a configuration example of server software 500.

FIG. 7 is a flowchart of a rule-based determination method.

FIG. 8 is a diagram illustrating a configuration example of a GUI 801.

FIG. 10A is a flowchart of learning processing of a learning model by the server 120.

FIG. 10B is a flowchart of processing performed by the MFP 100 to collect, and transmit to the server 120, network environment information, installation environment information, and setting values.

DESCRIPTION OF THE EMBODIMENTS

Figure 1:
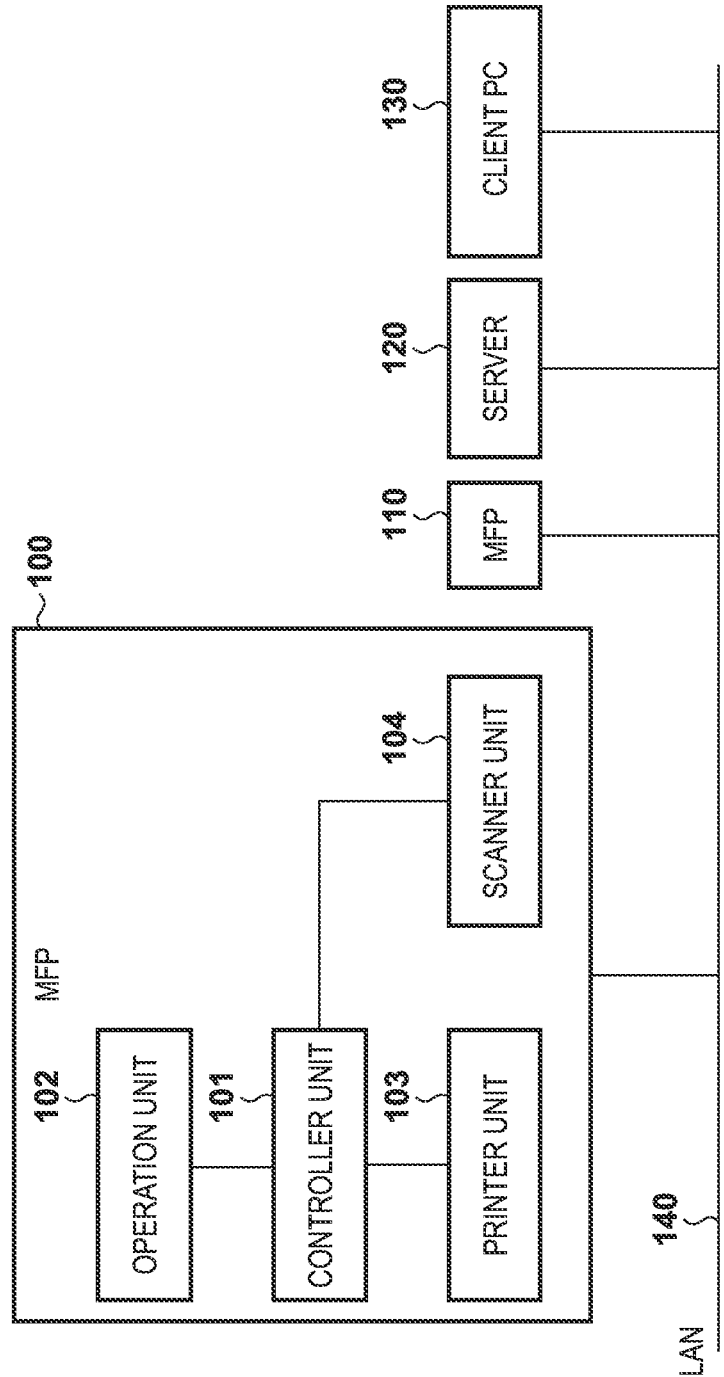
FIG. 1 is a block diagram illustrating a configuration example of a system.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

In the present embodiment, a server acquires network environment information (first information) used for determining a network environment to which a device belongs and installation environment information (second information) indicating the network environment (installation environment) to which the device belongs. The server then determines (identifies) a network environment to which the device belongs, based on the network environment information. The server then generates, based at least on whether the network environment being determined matches with the network environment indicated by the installation environment information, learning data used for learning processing of a learning model that is used by the device to determine the network environment. The server then performs the learning processing using the learning data.

Although a case of using a Multi-Function Peripheral (MFP) exemplifying an image forming apparatus is described as the aforementioned device in the present embodiment, the following description may similarly apply to any device other than an MFP.

First, a configuration example of a system according to the embodiment will be described, referring to the block diagram of FIG. 1. As illustrated in FIG. 1, the system according to the present embodiment includes an MFP 100, an MFP 110, a server 120, and a client PC 130, with the MFP 100, the MFP 110, the server 120, and the client PC 130 all being connected to a LAN 140. The LAN 140 may be a wired LAN or a wireless LAN, and the network form is not limited to any specific form.

Here, communication between apparatuses can be actually performed via a server such as a proxy server, a Domain Name System (DNS) server, or a WINS server. However, for the sake of simplicity, illustration of the servers is omitted in FIG. 1, and description related to the servers is omitted in the following.

First, the server 120 will be described. The server 120 manages the MFP 100 and the MFP 110. Although two MFPs, MFP 100 and MFP 110, are managed by the server 120 in FIG. 1, three or more MFPs may be managed.

The server 120 acquires the network environment information and the installation environment information from each of the MFP 100 and the MFP 110, and determines the network environment to which the MFP belongs (installation environment of the MFP), according to the network environment information. When the network environment being determined does not match with the network environment indicated by the installation environment information, the server 120 does not add the network environment information to the learning data. When, on the other hand, the network environment being determined matches with the network environment indicated by the installation environment information, the server 120 adds the network environment information to the learning data. The server 120 then performs learning processing of the learning model using the learning data generated in the aforementioned manner. The server 120 then provides the learning model generated by the learning processing to each of MFP 100 and MFP 110. Using the provided learning model, the MFP 100 and the MFP 110 determine a type of a network to which they belong, i.e., the network environment to which the MFP belongs (installation environment of the MFP), and generate installation environment information indicating the network environment being determined (installation environment). The MFP 100 and the MFP 110 then perform security setting in accordance with the network environment (installation environment) indicated by the installation environment information generated by themselves.

Next, the MFP 100 and the MFP 110 will be described. It is assumed in the present embodiment that the MFP 100 and the MFP 110 have the same configuration and perform similar operation, and therefore, although description will be made for the MFP 100 in the following, the same explanation also applies to the MFP 110.

An operation unit 102 is a user interface including a touch panel screen having a function of displaying images and characters and a function of input receiving that receives user operations, a numeric keypad, a power button, and various keys.

Based on data received from the outside or data read, by a scanner unit 104, from a print medium such as paper, a printer unit 103 forms images and characters on a print medium such as paper, and discharges the print medium. The scanner unit 104 reads, as images or characters, information printed on a print medium such as paper, and generates and outputs data of the images and characters being read.

The controller unit 101 controls the operation of the entire MFP 100, and also executes or controls various types of processing described to be performed by the MFP 100. Details of the controller unit 101 will be described later.

Next, the client PC 130 will be described. The client PC 130 is used to perform various operations on the MFP 100, such as transmitting a print job to the MFP 100, or causing the MFP 100 to hold the print job. Here, the client PC 130 is not limited to a PC and may be any other types of computer apparatuses such as a tablet terminal apparatus or a smartphone.

Figure 2:
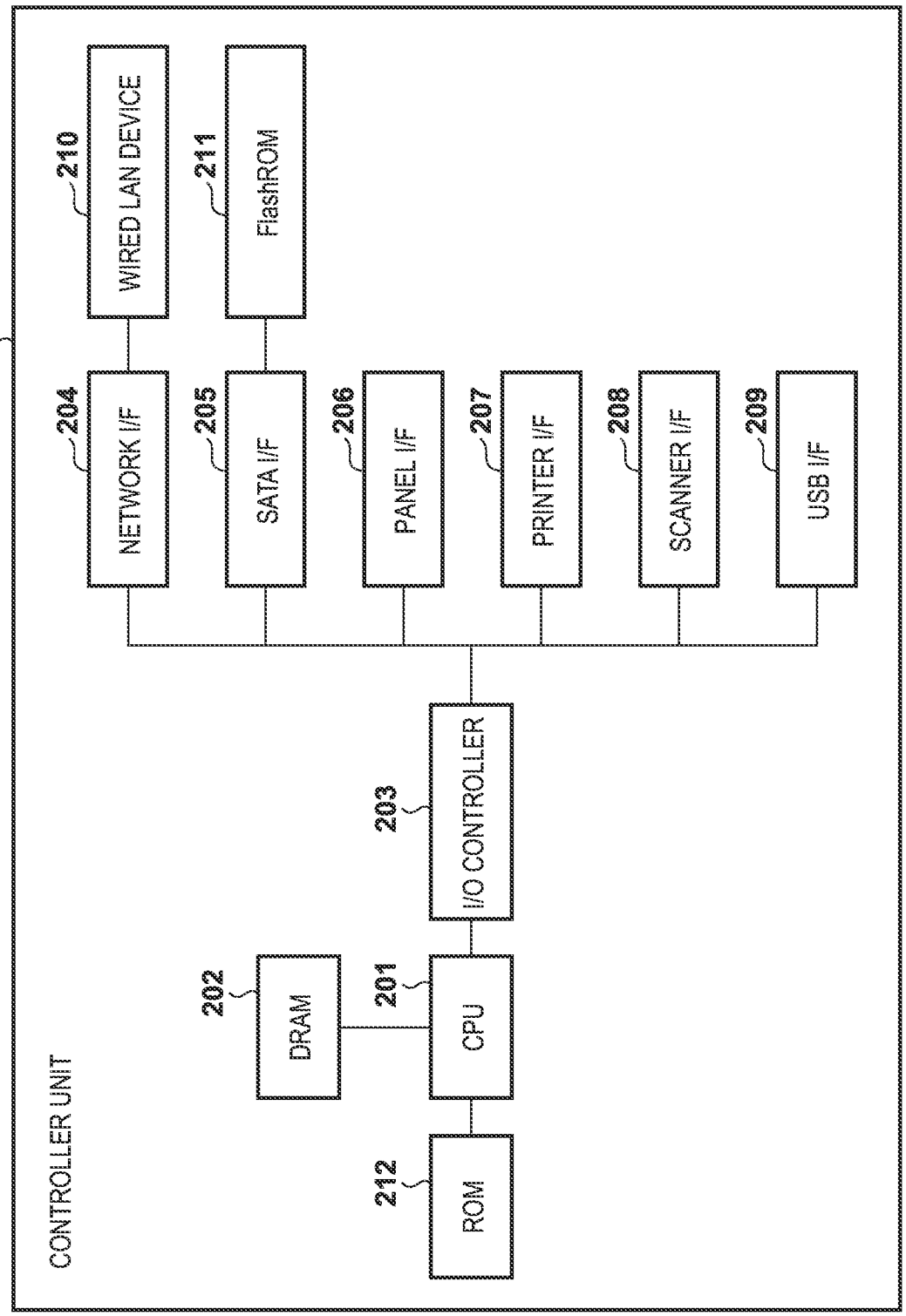
FIG. 2 is a block diagram illustrating a configuration example of a controller unit 101 of an MFP 100.

Next, a configuration example of the controller unit 101 of the MFP 100 will be described, referring to the block diagram illustrated in FIG. 2. A CPU 201 executes various processing using computer programs and data loaded from a ROM 212 into a DRAM 202. The CPU 201 thereby controls the operation of the entire MFP 100 including the controller unit 101, and also executes or controls various processing described to be performed by the MFP 100.

The ROM 212 stores setting data of the MFP 100, a computer program and data related to activation of the MFP 100, a computer program and data related to basic operation of the MFP 100, or the like. The computer programs and data stored in the ROM 212 are loaded as appropriate into the DRAM 202 in accordance with the control by the CPU 201, and subjected to processing by the CPU 201.

The DRAM 202 includes an area for storing the computer programs and data loaded from the ROM 212 or a Flash ROM 211, and a work area used when the CPU 201 executes various types of processing. In addition, the DRAM 202 includes an area for storing data input from the scanner unit 104 via a scanner I/F 208, and data input from a device connected to a USB I/F 209. In addition, the DRAM 202 includes an area for storing data received from the outside (the server 120 or the client PC 130 in the case of FIG. 1) via a network I/F 204 and a wired LAN device 210. In this way, the DRAM 202 can provide various types of areas as appropriate. Here, the areas provided by the DRAM 202 are not limited to those described above, and the DRAM 202 can provide areas to be used for various purposes as appropriate.

In accordance with an instruction from the CPU 201, an I/O controller 203 performs input/output on a device connected to a variety of I/Fs described later, which are connected to the I/O controller 203.

The CPU 201 controls the wired LAN device 210 via the network I/F 204 to perform data communication with devices (the server 120 and the client PC 130 in the case of FIG. 1) connected to the LAN 140.

The CPU 201 reads and writes computer programs and data from and to the Flash ROM 211 via a Serial Advanced Technology Attachment (SATA) I/F 205. The Flash ROM 211 stores computer programs and data for causing the CPU 201 to execute or control various types of processing described to be performed by the MFP 100.

The CPU 201 can perform data communication with the operation unit 102 via a panel I/F 206. For example, the CPU 201 acquires, via the panel I/F 206, various instructions and information input from the user by operating the operation unit 102. In addition, for example, the CPU 201 outputs various types of display information to be displayed on a touch panel screen of the operation unit 102 to the operation unit 102 (touch panel screen) via the panel I/F 206.

The CPU 201 performs data communication with the printer unit 103 via a printer I/F 207. For example, the CPU 201 acquires a state of the printer unit 103 (current printing status, remaining amount of ink, etc.) via the printer I/F 207. In addition, for example, CPU 201 transmits print target data to the printer unit 103 via the printer I/F 207.

The CPU 201 performs data communication with the scanner unit 104 via the scanner I/F 208. For example, the CPU 201 acquires a state of the scanner unit 104 via the scanner I/F 208. In addition, for example, the CPU 201 acquires, via the scanner I/F 208, data output from the scanner unit 104. The CPU 201 performs data communication with various devices connected to the USB I/F 209.

When a copy function is performed in the MFP 100 configured as described above, the CPU 201 reads computer programs and data from the Flash ROM 211 into the DRAM 202 via the SATA I/F 205. The CPU 201 then executes processing using the computer programs and data read into the DRAM 202 and detects, via the panel I/F 206, a copy instruction from the user to the operation unit 102. Upon detecting the copy instruction, the CPU 201 outputs a scan instruction to the scanner unit 104 via the scanner I/F 208. Upon receiving the scan instruction, the scanner unit 104 scans a document set on a document table and generates reading data of the document. The CPU 201 acquires, via the scanner I/F 208, the reading data generated by the scanner unit 104, and stores the acquired reading data in the DRAM 202. The CPU 201 then performs image processing such as color conversion processing suitable for outputting, on the reading data stored in the DRAM 202. The CPU 201 then outputs the reading data subjected to the image processing to the printer unit 103 via the printer I/F 207, and instructs, via the printer I/F 207, the printer unit 103 to print based on the reading data. In accordance with the instruction, the printer unit 103 performs printing processing to print images or characters on a print medium based on the reading data subjected to the image processing.

In addition, when PDL printing is performed in the MFP 100 configured as described above, the client PC 130 transmits, to the MFP 100 via the LAN 140, print data and a print instruction instructing the printing based on the print data. The CPU 201 reads computer programs and data from the Flash ROM 211 into the DRAM 202 via the SATA I/F 205. The CPU 201 then executes processing using the computer programs and data read into the DRAM 202. The CPU 201 thereby receives, via the network I/F 204, the print data and the print instruction transmitted from the client PC 130. The CPU 201 then outputs the print data to the Flash ROM 211 via the SATA I/F 205, and stores the print data in the Flash ROM 211. Upon completion of storing the print data to the Flash ROM 211, the CPU 201 deploys the print data stored in the Flash ROM 211 into the DRAM 202 as image data. The CPU 201 then performs image processing such as color conversion processing suitable for outputting, on the image data loaded in the DRAM 202. The CPU 201 then transmits, to the printer unit 103 via the printer I/F 207, the image data, which is subjected to the image processing and deployed in the DRAM 202, with the print instruction received from the client PC 130. In accordance with the print instruction, the printer unit 103 performs the printing processing to print images and characters on a print medium based on the image data.

Figure 4:
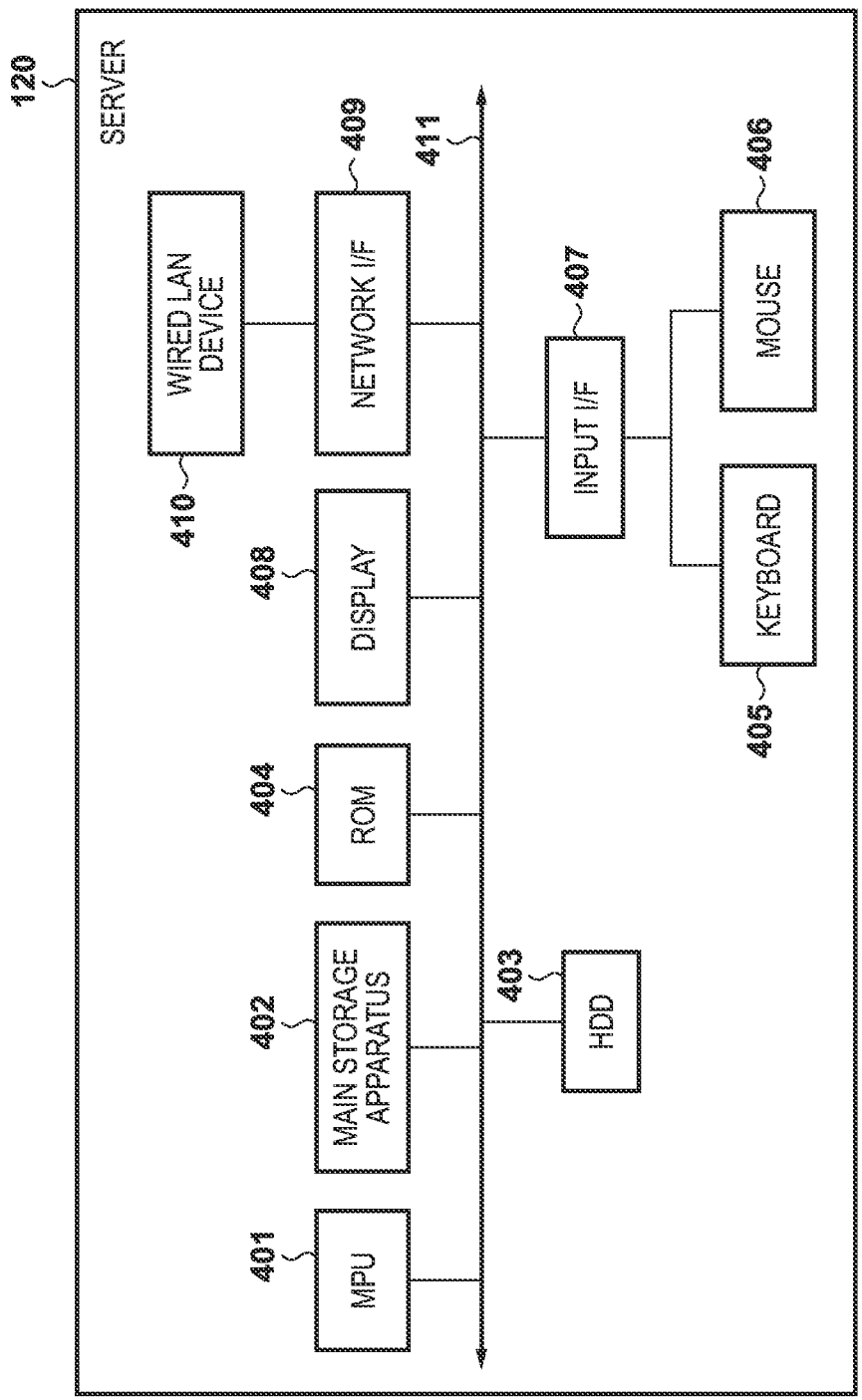
FIG. 4 is a block diagram illustrating a hardware configuration example of a server 120.

Next, a hardware configuration example of the server 120 will be described, referring to the block diagram of FIG. 4. An MPU 401 executes various processing using computer programs and data stored in a main storage apparatus 402. The MFP 100 thereby controls the operation of the entire server 120, and also executes or controls various types of processing described to be performed by the server 120.

The main storage apparatus 402 includes an area for storing computer programs and data loaded from a ROM 404 or an HDD 403. The main storage apparatus 402 further includes an area for storing data received from the outside (MFP 100, MFP 110, and client PC 130 in the case of FIG. 1) via a network I/F 409 and a wired LAN device 410. In addition, the main storage apparatus 402 includes a work area to be used when the MPU 401 executes various types of processing. In this way, the main storage apparatus 402 can provide various areas as appropriate.

The ROM 404 stores setting data of the server 120, a computer program and data related to activation of the server 120, a computer program and data related to the basic operation of the server 120, or the like. The computer programs and data stored in the ROM 404 are loaded into the main storage apparatus 402 as appropriate in accordance with the control by the MPU 401, and subjected to processing by the MPU 401.

An HDD 403 stores an operating system (OS), computer programs and data, or the like, for causing the MPU 401 to execute or control various types of processing described to be performed by the server 120. The computer programs and data stored in the HDD 403 are loaded into the main storage apparatus 402 as appropriate in accordance with the control of the MPU 401, and subjected to processing by the MPU 401.

A display 408, including a liquid crystal screen or a touch panel screen, displays the result of processing by the MPU 401 in the form of images, characters, or the like. Here, the display 408 may be a projection apparatus, such as a projector that projects images or characters.

An input I/F 407 is an interface configured to connect a user interface such as a keyboard 405 and a mouse 406. The keyboard 405 and the mouse 406, which are examples of a user interface, can input various instructions to the MPU 401 by the user's operation.

A wired LAN device 410 is connected to the network I/F 409. The MPU 401, by controlling the wired LAN device 410 via the network I/F 409, performs data communication with devices connected to the LAN 140 (MFP 100, MFP 110, and client PC 130 in the case of FIG. 1).

The MPU 401, the main storage apparatus 402, the HDD 403, the ROM 404, the display 408, the input I/F 407, and the network I/F 409 are all connected to a system bus 411.

Figure 3:
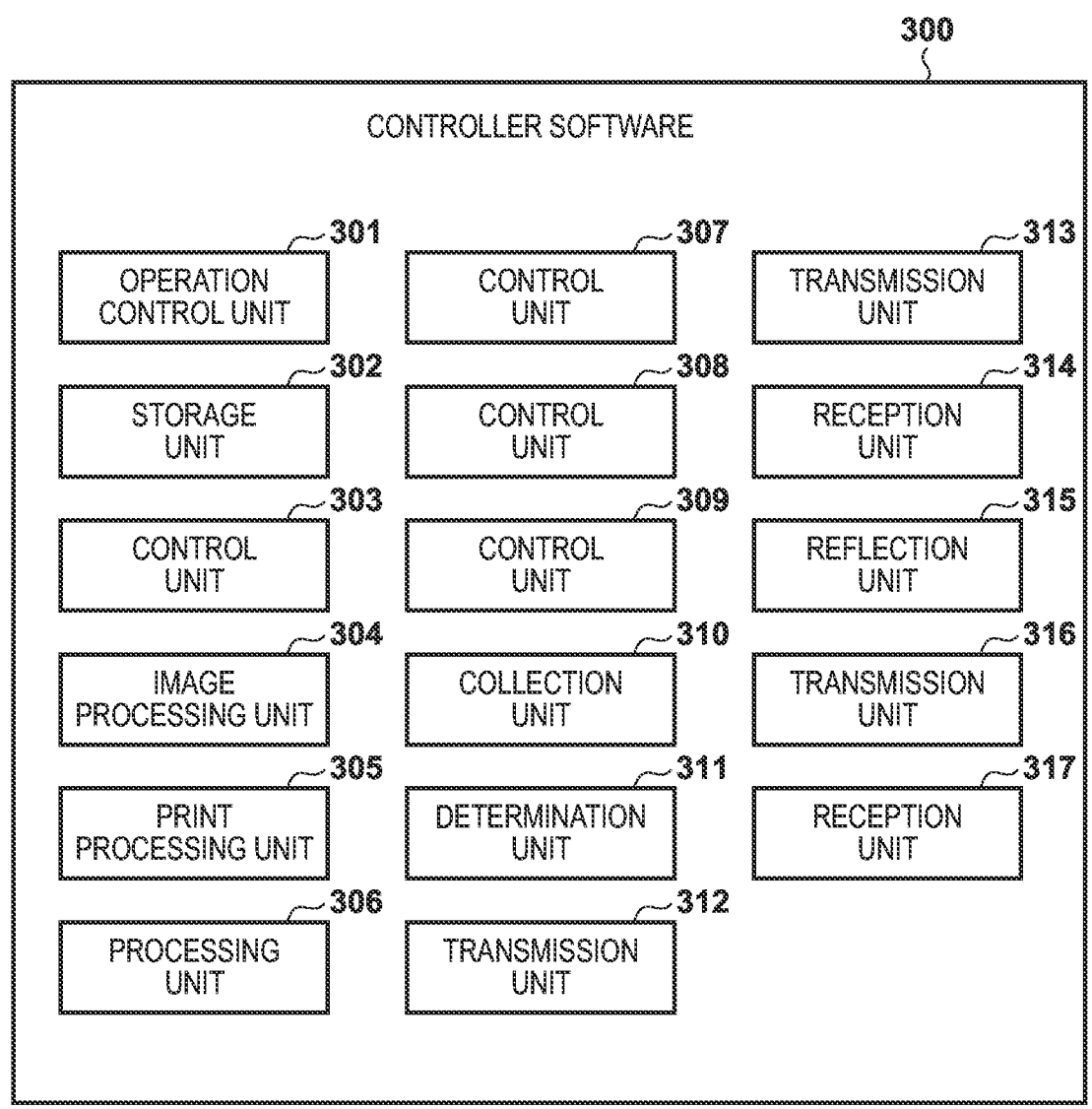
FIG. 3 is a block diagram illustrating a configuration example of controller software 300.

A configuration example of controller software 300, which is software (computer program) to be executed by the controller unit 120 of the MFP 100 will be described, referring to the block diagram of FIG. 3. Here, although the functional units illustrated in FIG. 3 may be described below as main entities of processing, functions of the functional units are actually realized by the CPU 201 executing software (computer programs) corresponding to respective functional units.

An operation control unit 301 is a user interface (UI) unit configured to display a user-oriented screen on a touch panel screen of the operation unit 102, and execute detection of user operations on the operation unit 102 and processing associated with a screen component such as a button displayed on the screen.

A storage unit 302 reads or writes data from or to the Flash ROM 211 in accordance with a request from another control unit. For example, when the user performs an operation for changing some device setting using the operation unit 102, the operation control unit 301 detects the content of the operation, and the storage unit 302 stores, in the Flash ROM 211, a setting value corresponding to the content of the operation in response to a request from the operation control unit 301.

A control unit 303 controls job execution in accordance with an instruction from another control unit. An image processing unit 304 modifies image data into a format suitable for each application in accordance with an instruction from the control unit 303. A print processing unit 305 controls the printer unit 103 via the printer I/F 207 to perform printing images and characters on a print medium, in accordance with an instruction from the control unit 303.

A processing unit 306 controls the scanner unit 104 via the scanner I/F 208 to cause the scanner unit 104 to execute scanning of the print medium, in accordance with an instruction from the control unit 303.

A control unit 307 performs network setting of IP addresses or the like on a control unit 308 in accordance with the setting values stored in the Flash ROM 211 by the storage unit 302, at an activation of the system or detection of a change of setting in MFP 100.

A control unit 308 performs network packet transmission and reception processing of with the outside (the server 120 or the client PC 130 in the example of FIG. 1) via the network I/F 204 and the wired LAN device 210, in accordance with an instruction from another control unit. A control unit 309 controls a device connected to the USB I/F 209, in accordance with an instruction from another control unit.

A collection unit 310 collects network environment information to be used for determining the network environment of the MFP 100. At the start of operation of the MFP 100, the collection unit 310 collects information related to setting values of the MFP 100 stored in the Flash ROM 211, and information acquired from devices existing in the network to which the MFP 100 belongs.

The collection unit 310 collects, as the information related to setting values of the MFP 100, for example, IP addresses and their types (global address or private address), a setting of whether to use a proxy server when the MFP 100 communicates with a device outside the LAN, settings of the protocol used for communication, and setting information related to the network environment stored in the Flash ROM 211.

In addition, the collection unit 310 collects, as information that can be acquired from devices existing in the network to which MFP 100 belongs, information of the network environment such as, for example, IP addresses and their types (global address or private address) of transmission sources of packets received by MFP 100, ports used for communication, Time to Live (TTL) of packets, responses to the Address Resolution Protocol (ARP) transmitted by the MFP 100, responses from the Domain Name System (DNS) server, Dynamic Host Configuration Protocol (DHCP) server information, and option information. In addition to the foregoing items, the collection unit 310 may refer to the determination result of accessibility to the WINS server, default router information, and other information that can be collected by the MFP 100.

The collection unit 310 then controls the storage unit 302 to store the collected network environment information in the Flash ROM 211. Here, it is exemplified that the collection unit 310 starts processing (starts collecting network environment information) at the start of operation of the MFP 100. However, the timing at which the collection unit 310 starts processing (starts collecting network environment information) is not limited to any specific timing. For example, the collection unit 310 may start processing (start collecting network environment information) in response to an instruction to start processing from the user by operating the operation unit 102 to the collection unit 310. Alternatively, the collection unit 310 may start processing (start collecting network environment information) in response to an instruction to start processing from the server 120 to the collection unit 310.

A determination unit 311 controls the storage unit 302 to acquire, from the Flash ROM 211, the network environment information collected by the collection unit 310. The determination unit 311 then determines (identifies) the network environment of the MFP 100 using the acquired network environment information, and generates installation environment information indicating the determined network environment.

In the determination of the network environment, the network environment of the MFP 100 is classified into predefined network environments such as a Small Office Home Office (SOHO), a public network, an intranet, or the like. Note that the network environment to be classified is not limited to the network environment exemplified here. In the following, a result of determining the network environment of the MFP 100 from the viewpoint of security based on the network environment information may be referred to as an "installation environment determination result". The method of determining the network environment may be, for example, proxy setting of the MFP 100 or detection of communication from the proxy server. In such a case, network boundary protection by the proxy server is applied and therefore the installation environment determination result is determined to be an intranet environment, which is a network environment with a relatively high security. Alternatively, the installation environment determination result is determined to be a SOHO environment in a case where the network boundary protection is not applied unlike the intranet environment but the network is operated as a private network. Alternatively, the installation environment determination result is determined to be a low-security public network environment in a case where the environment can be accessed by unspecified number of users, for example, a global address is set to the IP address, or direct communication with external servers or client devices is performed. Alternatively, when the DNS server is local, the installation environment determination result is determined to be Internet connection prohibited.

The determination unit 311 then generates installation environment information indicating the installation environment determination result thus determined. Here, the installation environment determination result may be displayed on the touch panel screen of the operation unit 102 to allow the user to check the installation environment determination result thus determined. In such a case, when the user operates the operation unit 102 to perform an input operation indicating that the installation environment determination result is valid, the determination unit 311 generates installation environment information indicating the installation environment determination result.

Here, an example of a rule-based determination method is illustrated that determines the network environment based on specific conditions. However, the network environment may be determined using a machine learning model that has learned the relationship between the collected network environment information and the network environment, or the network environment may be determined by another method.

A transmission unit 312 transmits the installation environment information generated by the determination unit 311 to the server 120. A transmission unit 313 transmits the network environment information collected by the collection unit 310 to the server 120.

A reception unit 314 receives a setting value template data group transmitted from the server 120 in response to a request from the MFP 100. The setting value template data, which is a set of setting values set by the MFP 100, and default values of the security settings of the MFP 100 are described therein. The setting value template data is different for each network environment. The reception unit 314 can receive setting value template data corresponding to any network environment from the server 120. Note that, the transmission unit 312 may transmit the installation environment information to the server 120, the server 120 may transmit the setting value template data corresponding to the installation environment information to the MFP 100, and the reception unit 314 may receive the setting value template data transmitted from the server 120.

A reflection unit 315 inputs the network environment information collected by the collection unit 310 to the learning model received by the reception unit 317 from the server 120, and acquires the installation environment information by performing calculation processing of the learning model. The reflection unit 315 then acquires setting value template data corresponding to the network environment indicated by the installation environment information being acquired, from the setting value template data group received by the reception unit 314. The reflection unit 315 then reflects the setting value template data being acquired in the security setting of the MFP 100. In reflecting the security setting, the current setting values of the security setting are changed to the default values of the security setting included in the setting value template data for all the security settings included in the setting value template data.

A transmission unit 316 acquires the current setting values for the MFP 100 stored in the Flash ROM 211 by the storage unit 302, and transmits the acquired setting values to the server 120. A reception unit 317 receives the learning model transmitted from the server 120.

Next, a configuration example of server software 500, which is software (computer programs) to be executed by the MFP 100 of the server 120 will be described, referring to a block diagram of FIG. 5. Here, although the functional units illustrated in FIG. 5 may be described below as the main entity of processing, functions of the functional units are actually realized by the MPU 401 executing software (computer programs) corresponding to the functional units.

A collection unit 501 receives the network environment information transmitted from the MFP 100. A collection unit 502 receives the installation environment information transmitted from the MFP 100. A determination unit 503 determines (identifies) a network environment to which the MFP 100 belongs, according to the network environment information.

A learning unit 504 does not add the network environment information received by the collection unit 501 to the learning data when the network environment determined by the determination unit 503 does not match with the network environment indicated by the installation environment information received by the collection unit 502. When, on the other hand, the network environment determined by the determination unit 503 matches with the network environment indicated by the installation environment information received by the collection unit 502, the learning unit 504 adds the network environment information received by the collection unit 501 to the learning data. The learning unit 504 then performs learning processing of the learning model using the learning data generated as described above. For example, the learning unit 504 performs the learning processing of the learning model using the learning data and the installation environment information corresponding to the network environment information included in the learning data.

A transmission unit 505 transmits the learning model learned by the learning unit 504 to the MFP 100. A delivery unit 506 transmits setting value template data to the MFP 100 in accordance with a request from the MFP 100.

Figure 6A:
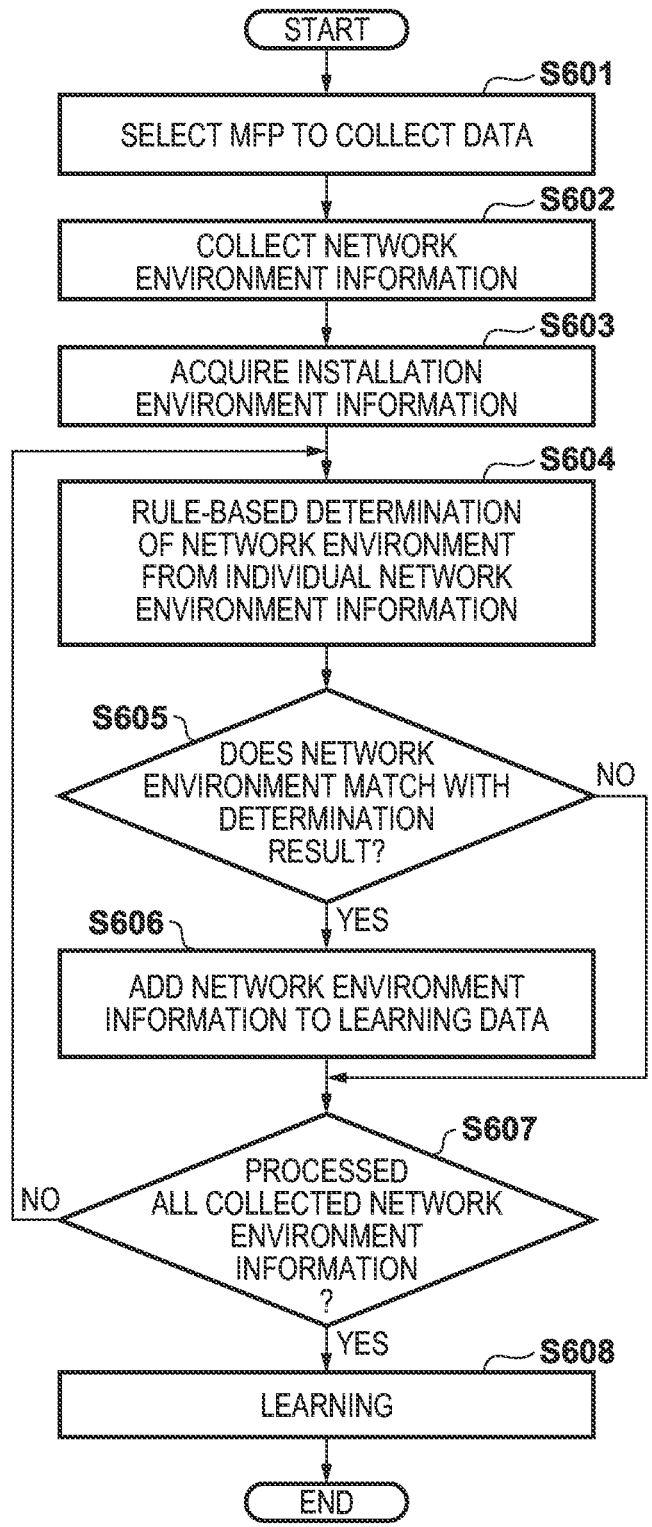
FIG. 6A is a flowchart of learning processing of a learning model by the server 120.

Next, the learning processing of the learning model by the server 120 will be described, referring to the flowchart of FIG. 6A. At step S601, the MPU 401 selects an MFP among the MFP 100 and the MFP 110 as a target MFP which is a target of data collection. In the case of FIG. 1, the target MFP may be both or one of the MFP 100 and the MFP 110.

At step S602, the MPU 401 (the collection unit 501) acquires the network environment information transmitted from the target MFP in accordance with a request to the target MFP. The MPU 401 then stores the network environment information being acquired in the main storage apparatus 402 in association with an identifier of the target MFP. Here, as the identifier of the target MFP, information such as a serial number assigned to the target MFP, a MAC address or an IP address assigned to the target MFP is used, with which the target MFP is uniquely identifiable.

At step S603, the MPU 401 (the collection unit 502) acquires the installation environment information transmitted from the target MFP in accordance with a request to the target MFP. The MPU 401 then stores the installation environment information being acquired in the main storage apparatus 402 in association with the identifier of the target MFP. Usually, same installation environment information is transmitted from an MFP belonging to a network same as the network to which the server 120 belongs, and different installation environment information is transmitted from an MFP belonging to a network different from the network to which the server 120 belongs.

At step S604, the MPU 401 (the determination unit 503) selects one MFP, among the target MFPs that are not selected yet, as a selected MFP. The MPU 401 then determines (identifies), by a rule-based determination method, the network environment of the selected MFP, according to the network environment information corresponding to the identifier of the selected MFP. The rule-based determination method will be described later.

At step S605, the MPU 401 (the learning unit 504) determines whether the network environment determined at step S604 matches with the network environment indicated by the installation environment information corresponding to the identifier of the selected MFP. According to the result of the determination, when it is determined to be matched, the processing proceeds to step S606. When it is determined to be not matched, the processing proceeds to step S607.

At step S606, the MPU 401 (the learning unit 504) adds the network environment information of the selected MFP to the learning data. In this way, when the network environment determined at step S604 does not match with the network environment indicated by the installation environment information of the selected MFP, the processing at step S606 is not executed and therefore the network environment information of the selected MFP is not added to the learning data.

At step S607, the MPU 401 determines whether the network environment information of all the target MFPs is processed (i.e., whether all the target MFPs are selected as selected MFPs).

According to the result of the determination, when it is determined that the network environment information of all the target MFPs is processed (all the target MFPs are selected as selected MFPs), the processing proceeds to step S608. When, on the other hand, there remains network environment information that is not processed (there remains any target MFPs that are not selected as a selected MFP among the target MFPs), the processing proceeds to step S604.

At step S608, the MPU 401 (the learning unit 504) performs the learning processing of the learning model using the learning data generated as described above.

Next, the rule-based determination method used at the aforementioned step S604 will be described, referring to the flowchart of FIG. 7. At step S701, the MPU 401 (the determination unit 503) determines whether the WINS server information can be acquired from the network environment information of the selected MFP. According to the result of the determination, when it is determined that the WINS server information can be acquired, the processing proceeds to step S703. When it is determined that the WINS server information cannot be acquired, the processing proceeds to step S702.

At step S702, the MPU 401 (the determination unit 503) determines whether the DHCP server address and the default router are mismatching in the network environment information of the selected MFP. According to the result of the determination, when it is determined to be mismatching, the processing proceeds to step S703. When it is determined to be not mismatching (matching) the processing proceeds to step S708.

At step S703, the MPU 401 (the determination unit 503) determines whether the IP address of the DNS server is a global address, according to the network environment information of the selected MFP. According to the result of the determination, when the IP address of the DNS server is a global address, the processing proceeds to step S704. When the IP address of the DNS server is not a global address, the processing proceeds to step S707.

At step S704, the MPU 401 (the determination unit 503) determines whether the transmission address is a local address, according to the network environment information of the selected MFP. According to the result of the determination, when the transmission address is a local address, the processing proceeds to step S705. When the transmission address is not a local address, the processing proceeds to step S706.

At step S705, the MPU 401 (the determination unit 503) determines that the network environment of the selected MFP is an intranet. At step S706, the MPU 401 (the determination unit 503) determines that the network environment of the selected MFP is a public network. At step S707, the MPU 401 (the determination unit 503) determines that the network environment of the selected MFP is Internet-prohibited. At step S708, the MPU 401 (the determination unit 503) determines that the network environment of the selected MFP is a SOHO.

Figure 6B:
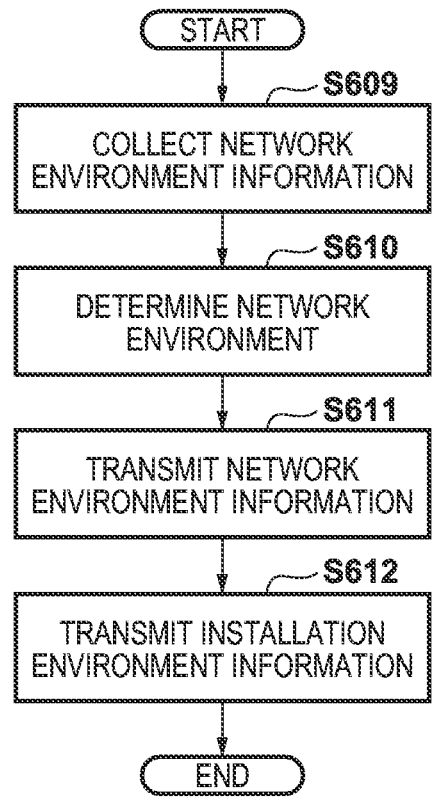
FIG. 6B is a flowchart of processing performed by the MFP 100 to collect, and transmit to the server 120, network environment information and installation environment information.

Next, processing performed by the MFP 100 to collect and transmit, to the server 120, the network environment information and the installation environment information will be described, referring to the flowchart of FIG. 6B. At a timing, for example, after the start of operation of the MFP 100, the CPU 201 (the collection unit 310) collects network environment information at step S609.

At step S610, the CPU 201 (the determination unit 311) determines (identifies) the network environment of the MFP 100 using the network environment information collected at step S609, and generates installation environment information indicating the determined network environment.

At this time, the CPU 201 controls the operation control unit 301 to display a GUI 801, illustrated in FIG. 8 as an example, on the touch panel screen of the operation unit 102. In the GUI 801 of FIG. 8, "intranet", "SOHO", "public", and "Internet-prohibited" are displayed, with check buttons, as network environments. In FIG. 8, a check button corresponding to "intranet" is on, indicating that the installation environment determination result is an "intranet". When a user determines, as a result of checking the GUI 801, that the "intranet" is correct as the network environment of the MFP 100, the user operates the operation unit 102 to point the OK button. On the other hand, when the user determines, as the result of checking the GUI 801, that another network environment (e.g., "SOHO"), not the "intranet", is correct as the network environment of the MFP 100, the user operates the operation unit 102 to turn on the check button corresponding to a desired network environment. When the user operates the operation unit 102 to point the "OK" button, the CPU 201 determines the network environment with check button being on as the installation environment determination result, and generates installation environment information indicating the installation environment determination result.

At step S611, the CPU 201 (the transmission unit 313) transmits the network environment information collected at step S609 to the server 120. At step S612, the CPU 201 (the transmission unit 312) transmits the installation environment information generated at step S610 to the server 120.

In this way, the server 120 in the present embodiment acquires, from the MFP 100, the network environment information and the installation environment information of the MFP 100, and uses the acquired information for learning of the learning model. The learning model generated by the learning is subsequently distributed to the MFP 100 by push delivery from the server 120 as a start point, or in response to a request from the MFP 100 as a start point. The MFP 100 then determines its own network environment by using the learning model being distributed, and applies a setting value template to security setting in accordance with the determined network environment. Accordingly, it is possible to perform an appropriate security setting to the network environment of the MFP 100.

Here, network environment information in a case where the network environment determined by the rule-based determination method differs from the actual network environment, the learning data is considered as not typical for the network environment. The inference accuracy of the learning model can be improved by excluding such data.

However, an overly strict determination may exclude data at the boundary between useful and useless for learning. In such a case, it is conceivable to reduce the number of rules for determination. For example, in a case where the installation environment information is a SOHO, and when the determination at step S701 is No, the network environment information is regarded as a SOHO and added to the learning data, and thus as much data as possible may be available, as learning data, including data determined to be of another network environment.

In this way, according to the present embodiment, it is possible to prevent degradation of the inference accuracy of the learning model by not adding the collected data as the learning data, when the network environment determined by the rule-based determination method differs from the actual network environment.

Variation Example

In the present variation example, by using a setting value in the MFP in addition to the network environment information, the determination accuracy of the network environment of the MFP is improved. The learning processing of the learning model by the server 120 will be described, referring to the flowchart of FIG. 10A. In FIG. 10A, processing steps similar to the processing steps illustrated in FIG. 6A are provided with same step numbers, and description of those processing steps will be omitted.

At step S1004, the MPU 401 acquires the setting values for the MPU 401 transmitted from the target MFP in response to a request to the target MFP. The setting values acquired at step S1004 are, for example, setting values currently set in the target MFP as setting values related to network communication. The MPU 401 then stores the acquired setting values in the main storage apparatus 402 in association with the identifier of the target MFP.

At step S1005, the MPU 401 (the determination unit 503) selects one MFP, among the target MFPs that are not selected yet, as a selected MFP. The MPU 401 then determines (identifies) the network environment to which the MFP 100 belongs according to a rule-based determination method from the network environment information and the setting values corresponding to the identifier of the selected MFP.

In the present embodiment, according to the result of the determination at step S605, when it is determined to be matched, the processing proceeds to step S1007. When it is determined to be not matched, the processing proceeds to step S607.

At step S1007, the MPU 401 (the learning unit 504) adds the network environment information and the setting values of the selected MFP to the learning data. In this way, when the network environment identified at step S1005 does not match with the network environment indicated by the installation environment information of the selected MFP, the processing at step S1007 is not executed and therefore the network environment information and the setting values of the selected MFP are not added to the learning data.

In the present embodiment, according to the result of the determination at step S607, when the network environment information of all the target MFPs is processed (all the target MFPs are selected as selected MFPs), the processing proceeds to step S608. When, on the other hand, there remains network environment information that is not processed (there remains any target MFPs that are not selected as the selected MFP among the target MFPs), the processing proceeds to step S1005.

Next, processing performed by the MFP 100 to collect and transmit, to the server 120, network environment information, installation environment information, and setting values will be described, referring to the flowchart of FIG. 10B. In FIG. 10B, processing steps similar to the processing steps illustrated in FIG. 6B are provided with same step numbers, and description of those processing steps will be omitted. At step S1014, the CPU 201 (the transmission unit 316) collects the setting values of the MFP 100 and transmits the collected setting values to the server 120.

In this way, according to the present variation example, the network environment of the MFP is determined using the setting values of the MFP in addition to the network environment information, and therefore it is possible to increase the possibility of generating a learning model having a higher inference accuracy.

Second Embodiment

Figure 9:
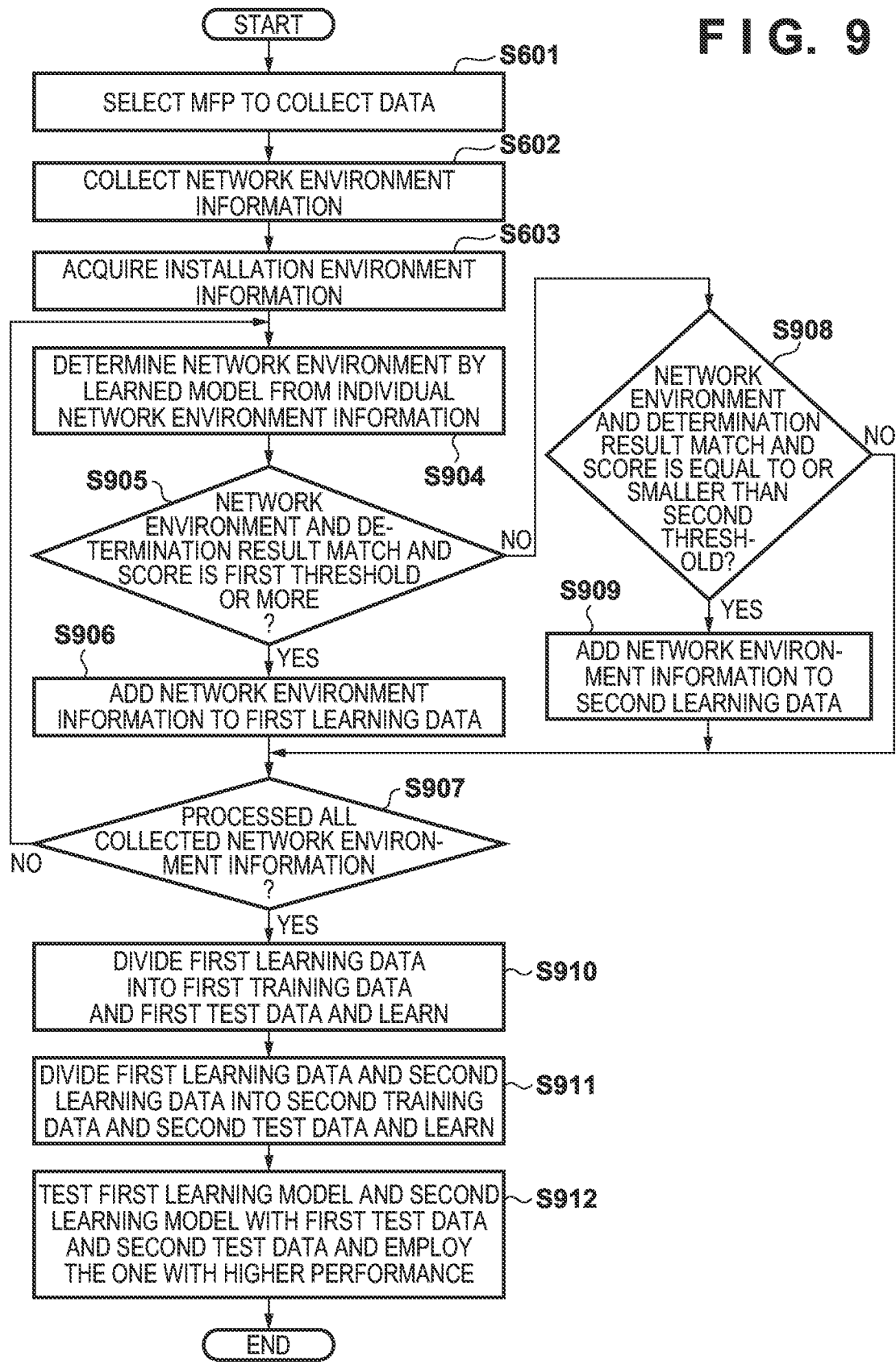
FIG. 9 is a flowchart of learning processing of the learning model by the server 120.

In the following, a difference between a second embodiment and the first embodiment is described, and it is assumed that the second embodiment is the same as the first embodiment unless otherwise specified. The learning processing of the learning model by the server 120 will be described, referring to the flowchart of FIG. 9. In FIG. 9, processing steps similar to the processing steps illustrated in FIG. 6A are provided with same step numbers, and description of those processing steps will be omitted.

At step S904, the MPU 401 (the determination unit 503) selects one MFP, among the target MFPs that are not selected yet, as a selected MFP. The MPU 401 then inputs the network environment information corresponding to the identifier of the selected MFP to the "machine learning model which has already learned the correspondence relation between the network environment information and the installation environment information", and performs calculation of the machine learning model.

At step S905, the MPU 401 (the determination unit 503) identifies a piece of installation environment information having the highest score PM as the installation environment determination result, among the scores of each of the pieces of installation environment information acquired by the calculation at step S904. The MPU 401 then determines whether a condition 1 that "the installation environment determination result matches with the installation environment information acquired at step S603, and the score PM is equal to or larger than a first threshold value" is satisfied.

According to the result of the determination, when the condition 1 is satisfied, the processing proceeds to Step S906. On the other hand, according to the result of the determination, when the condition 1 is not satisfied, the processing proceeds to step S908.

At step S906, the MPU 401 (the learning unit 504) adds the network environment information of the selected MFP to the first learning data. At step S908, the MPU 401 (the determination unit 503) determines whether a condition 2 that "the installation environment determination result matches with the installation environment information acquired at step S603, and the score PM is equal to or smaller than a second threshold value (second threshold value<first threshold value)" is satisfied.

According to the result of the determination, when the condition 2 is satisfied, the processing proceeds to step S909. On the other hand, according to the result of the determination, when the condition 2 is not satisfied, the processing proceeds to step S907.

At step S909, the MPU 401 (the learning unit 504) adds the network environment information of the selected MFP to the second learning data. At step S907, the MPU 401 determines whether the network environment information of all the target MFPs is processed (i.e., whether all the target MFPs are selected as selected MFPs).

According to the result of the determination, when the network environment information of all the target MFPs is processed (all the target MFPs are selected as selected MFPs), the processing proceeds to step S910. When, on the other hand, there remains network environment information that is not processed (there remains any target MFPs that are not selected as the selected MFP among the target MFPs), the processing proceeds to step S904.

At step S910, the MPU 401 (the learning unit 504) divides the first learning data into first training data and first test data. There are various methods for a method of dividing the first learning data into the first training data and the first test data, without being limited to any specific method. For example, the first learning data may be simply divided into two data groups without providing any index, and one of the data groups is set to the first training data and the other of the data groups is set to the first test data. Alternatively, for example, the first learning data may be divided into two data groups based on a preliminarily set first index, and one of the data groups is set to the first training data and the other of the data groups is set to the first test data. The MPU 401 then generates a first learning model by learning processing using the first training data.

At step S911, the MPU 401 (the learning unit 504) divides a set of the first learning data and the second learning data (learning data set) into second training data and second test data. There are various methods for a method of dividing the learning data set into the second training data and the second test data, without being limited to any specific method. For example, the learning data set may be simply divided into two data groups without providing any index, and one of the data groups is set to the second training data and the other is set to the second test data. Alternatively, for example, the learning data set may be divided into two data groups based on a preliminarily set second index, and one of the data groups is set to the second training data and the other of the data groups is set to the second test data. The MPU 401 then generates a second learning model by learning processing using the second training data.

At step S912, the MPU 401 (the learning unit 504) tests the first learning model using the first test data, and also tests the second learning model using the second test data. The MPU 401 then determines, according to the result of each test, the one exhibiting a higher performance as the learning model to be employed. The processing of respectively evaluating the performance of the first learning model and the second learning model using the first test data and the second test data and determining the one exhibiting a higher performance as the learning model to be employed is not limited to any specific processing.

For example, the MPU 401 obtains the performance of the first learning model, in case of inputting the first test data, by using metrics such as F1 scores, and obtains the performance of the second learning model, in case of inputting the second test data, by using metrics such as F1 scores. The MPU 401 then determines the one exhibiting a higher performance as the learning model to be employed.

The "learning model to be employed" refers to a learning model that the server 120 subsequently provides to the MFP 100 and the MFP 110. Here, the test result of the first learning model (evaluation value acquired by the test) and the test result of the second learning model (evaluation value acquired by the test) may be displayed on the display 408 to allow the user to select which of the first learning model and the second learning model is set as the "learning model to be employed". The MPU 401 (the learning unit 504) determines the learning model selected by the user using the keyboard 405 or the mouse 406 as the "learning model to be employed".

In this way, according to the present embodiment, it is possible to increase the possibility of generating a learning model with a high inference accuracy by using the score of the inference result of the learning model to generate learning data as a candidate to be employed.

Third Embodiment

Although it is assumed in the aforementioned embodiments and variations thereof that the learning data is network packet data that is structured data with a defined data format, this is merely an example and other structured data may also be used.

For example, data compressed in ZIP (referred to as ZIP file in the following), which is a known data compression format, is structured data including a header with a defined data format such as the aforementioned packet header. Similarly to the packet header, the header of a ZIP file includes a plurality of fields. For example, a ZIP file includes a "local file header signature" field with a field size of 4 bytes at the top of the header as a field for storing a signature of a local file header. In addition, the header of a ZIP file includes a plurality of fields with a defined data format, such as a "version needed to extract" field with a field size of 2 bytes, which is a field for storing the lowest version of the ZIP required for decompression. Here, for example, learning can be performed in a similar manner to that for a network packet by regarding a field of the header of the ZIP file as a field of the network packet data. In this way, the learning data may be any data as long as the data is structured data with a defined data format, other than the network packet data and the ZIP file described above.

Here, numerical values, processing timing, order of processing, entity of processing, data (information) acquisition method/transmission destination/transmission source/storage location, or the like, which are used in each of the embodiments and the variation example described above, are given as an example for providing specific description, and are not intended to limit the disclosure to such an example.

In addition, part or all of each of the embodiments and the variation example explained above may be used in combination as appropriate. Some or all of the embodiments and variation example described above may be used selectively.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-155297, filed Sep. 28, 2022, which is hereby incorporated by reference herein in its entirety.

What is claimed is:

1. An information processing apparatus comprising:
at least one memory storing a program; and
at least one processor that executes the stored program, which causes the at least one processor to:
acquire first information used for determining a network environment to which a device belongs, and second information indicating the network environment to which the device belongs;
determine a network environment to which the device belongs, based on the first information;
generate, based at least on whether the determined network environment matches with the network environment indicated by the second information, learning data used in learning processing of a learning model that is used by the device to determine the network environment; and
perform the learning processing using the learning data, wherein the at least one processor, determines, according to the first information, the network environment to which the device belongs, by a rule-based determination method, and
determines that the network environment to which the device belongs is a SOHO, when WINS server information cannot be acquired from the first information, and a DHCP server address and a default router are not mismatching in the first information.

2. The information processing apparatus according to claim 1, wherein the at least one processor does not add the first information to the learning data when the determined network environment does not match with the network environment indicated by the second information, and adds the first information to the learning data when the determined network environment matches with the network environment indicated by the second information.

3. The information processing apparatus according to claim 1, wherein
the at least one processor
adds the first information to first learning data when the determined network environment matches with the network environment indicated by the second information, and a score indicating a result of the determination is equal to or larger than a first threshold value,
adds the first information to second learning data when the determined network environment matches with the network environment indicated by the second information, and a score indicating the result of the determination is equal to or smaller than a second threshold that is smaller than the first threshold,
generates a first learning model by learning processing using a part of the first learning data,
generates a second learning model by learning using a part of a set of the first learning data and the second learning data,
determines one of the first learning model and the second learning model as the learning model, based on a result of a test of the first learning model using the part of the first learning data and a result of a test of the second learning model using the part of the set.

4. The information processing apparatus according to claim 1, wherein the at least one processor determines that the network environment to which the device belongs is Internet-prohibited, when WINS server information cannot be acquired from the first information, a DHCP server address and a default router are mismatching in the first information, and an IP address of a DNS server is not a global address according to the first information.

5. The information processing apparatus according to claim 1, wherein the at least one processor determines that the network environment to which the device belongs is Internet-prohibited, when WINS server information can be acquired from the first information, and an IP address of a DNS server is not a global address according to the first information.

6. The information processing apparatus according to claim 1, wherein the at least one processor determines that the network environment to which the device belongs is a public network, when WINS server information cannot be acquired from the first information, a DHCP server address and a default router are mismatching in the first information, an IP address of a DNS server is a global address according to the first information, and a transmission address is not a local address according to the first information.

7. The information processing apparatus according to claim 1, wherein the at least one processor determines that the network environment to which the device belongs is a public network, when WINS server information can be acquired from the first information, an IP address of a DNS server is a global address according to the first information, and a transmission address is not a local address according to the first information.

8. The information processing apparatus according to claim 1, wherein the at least one processor determines that the network environment to which the device belongs is an intranet, when WINS server information cannot be acquired from the first information, a DHCP server address and a default router are mismatching in the first information, an IP address of a DNS server is a global address according to the first information, and a transmission address is a local address according to the first information.

9. The information processing apparatus according to claim 1, wherein the at least one processor determines that the network environment to which the device belongs is an intranet, when WINS server information can be acquired from the first information, an IP address of a DNS server is a global address according to the first information, and a transmission address is a local address according to the first information.

10. The information processing apparatus according to claim 1, wherein the at least one processor further transmits, to the device, a learning model that has been learned.

11. The information processing apparatus according to claim 1, wherein the at least one processor further transmits, to the device, a setting value template for each network environment, the setting value template having described therein a default value for security setting of the device.

12. The information processing apparatus according to claim 1, wherein the device is a Multi-Function Peripheral (MFP).

13. An information processing method performed by an information processing apparatus, the method comprising:
    acquiring first information used for determining a network environment to which a device belongs, and second information indicating the network environment to which the device belongs;
    determining a network environment to which the device belongs, based on the first information;
    generating, based at least on whether the network environment determined by the determining matches with the network environment indicated by the second information, learning data used in learning processing of a learning model that is used by the device to determine the network environment, and
    performing the learning processing using the learning data;
    determining, according to the first information, the network environment to which the device belongs, by a rule-based determination method, and
    determining that the network environment to which the device belongs is a SOHO, when WINS server information cannot be acquired from the first information, and a DHCP server address and a default router are not mismatching in the first information.

14. A non-transitory computer-readable storage medium storing a computer program for causing a computer to:
    acquire first information used for determining a network environment to which a device belongs, and second information indicating the network environment to which the device belongs;
    determine a network environment to which the device belongs, based on the first information;
    generate, based at least on whether the determined network environment matches with the network environment indicated by the second information, learning data used in learning processing of a learning model that is used by the device to determine the network environment;
    perform the learning processing using the learning data;
    determine, according to the first information, the network environment to which the device belongs, by a rule-based determination method; and
    determine that the network environment to which the device belongs is a SOHO, when WINS server information cannot be acquired from the first information, and a DHCP server address and a default router are not mismatching in the first information.

* * * * *